United States Patent
Posti et al.

(10) Patent No.: US 6,466,794 B1
(45) Date of Patent: Oct. 15, 2002

(54) CHANNEL ALLOCATION IN A MOBILE COMMUNICATIONS SYSTEM

(75) Inventors: Harri Posti; Jukka Peltola, both of Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/357,180

(22) Filed: Jul. 20, 1999

Related U.S. Application Data

(63) Continuation of application No. PCT/FI98/00044, filed on Jan. 21, 1998.

(30) Foreign Application Priority Data

Jan. 30, 1997 (FI) ................................. 970389

(51) Int. Cl.[7] ................................. H04Q 7/20
(52) U.S. Cl. ................. 455/450; 455/447; 370/330
(58) Field of Search ....................... 455/446, 447, 455/450, 451, 452, 12.1, 428; 370/329, 330, 337, 344, 347, 436, 478, 480, 522

(56) References Cited

U.S. PATENT DOCUMENTS

| | | | |
|---|---|---|---|
| 4,736,453 A | * 4/1988 | Schloemer | 455/450 |
| 5,247,699 A | 9/1993 | Hartman | |
| 5,428,818 A | 6/1995 | Median et al. | |
| 5,574,969 A | * 11/1996 | Olds et al. | 455/12.1 |
| 5,613,198 A | * 3/1997 | Ahmadi et al. | 455/447 |
| 5,666,649 A | 9/1997 | Dent | 455/445 |
| 5,729,534 A | * 3/1998 | Jokinen et al. | 370/280 |
| 5,732,073 A | * 3/1998 | Kusaki et al. | 370/280 |
| 5,809,423 A | * 9/1998 | Benveniste | 455/452 |
| 5,862,479 A | * 1/1999 | Cutler, Jr. et al. | 455/428 |
| 5,886,988 A | * 3/1999 | Yun et al. | 370/329 |
| 5,930,706 A | * 7/1999 | Raith | 455/422 |
| 6,011,786 A | * 1/2000 | Dent | 370/330 |
| 6,091,954 A | * 7/2000 | Haartsen et al. | 455/447 |

FOREIGN PATENT DOCUMENTS

| | | |
|---|---|---|
| DE | 19516078 | 11/1996 |
| WO | WO 9403993 | 2/1994 |
| WO | WO 96/21987 | * 7/1996 |

OTHER PUBLICATIONS

"The GSM System for Mobile Communications" Mouly, et al. p., 224 lines 34–36; p. 325, line 47; p. 327, line 29.
International Search Report for PCT/FI98/00044.

* cited by examiner

Primary Examiner—Dwayne Bost
Assistant Examiner—Joy K. Contee
(74) Attorney, Agent, or Firm—Altera Law Group, LLC

(57) ABSTRACT

The use of frequencies can be made more efficient in a mobile communications system with frequency hopping and a method of discontinuous transmission. However, continuous transmission calls unsuitable for discontinuous transmission will hereby cause excessive interference in the network. This invention concerns a channel allocation method in a mobile communications system where some radio connections are implemented with a discontinuous transmission function. The method identifies continuous transmission calls for which according to the invention a fixed-frequency traffic channel defined as a continuous transmission traffic channel is allocated. In addition, the invention concerns an arrangement for allocation of a traffic channel in a mobile communications system where some radio connections are implemented with a discontinuous transmission function. The arrangement is adapted to identify continuous transmission calls. According to the invention, the arrangement is characterized in that it is adapted for allocation of a fixed-frequency traffic channel defined as a continuous transmission traffic channel for a continuous transmission call.

8 Claims, 3 Drawing Sheets

CHANNEL ALLOCATION IN A MOBILE COMMUNICATIONS SYSTEM

This application is a continuation of PCT/FI98/00044 filed Jan. 21, 1998.

FIELD OF APPLICATION OF THE INVENTION

This invention concerns a method and an arrangement for allocation of a traffic channel for a radio connection in a mobile communications system, wherein some radio connections are implemented with a discontinuous transmission function. Continuously transmitted calls are identified in the method.

BACKGROUND OF THE INVENTION

In mobile communications systems of the cellular type it is an aim to arrange the reuse of frequencies as efficiently as possible due to their limited scope. The same frequency may be used again in another cell, which is at least at such a reuse distance from the cell concerned which is determined by mutual interference. By using methods for reducing mutual interference, e.g. discontinuous transmission and frequency hopping, the frequency reuse distance will shorten and the network capacity will grow at the same time.

DTX (Discontinuous Transmission) means a functionality where the transmission of a mobile station or a base station to the radio path can be cut off when the transmitted signal does not contain any information significant to the recipient, e.g. for the time of pauses in speech. This is to reduce the power consumption, which is very essential for the mobile station, and to lower the network interference level.

Discontinuous transmission is generally known in connection with digital mobile communications systems. E.g. in the mobile station and at the base station of a GSM system the speech activity of the transmitted signal is monitored and the transmission to the radio path is cut off when there is no speech information. When speech is resumed, the speech is coded and transmitted to the radio path in the correct time slot. Of course, it is possible to utilise discontinuous transmission only when the contents of the transmission are known, that is, e.g. in connection with speech and non-transparent data transmission. At other times, e.g. in a case of transparent data transmission, the transmission can not be cut off, because it is not known when this can be done without reducing the quality of the service.

Co-channel interference caused by various base station signals and the effect of fading of the signal to be transferred in the radio path can be reduced with the aid of frequency hopping, whereby the frequency used in the radio connection is changed in accordance with a predetermined frequency hopping pattern. Frequency hopping may be implemented as either base-band frequency hopping or for individual transmitters as a change of radio frequency. In base-band hopping, the transmitted signal is connected to the radio path from a fixed-frequency transmitter selected at each moment. In radio-frequency hopping, the transmission frequency of the transmitter is changed by a synthesiser. In both methods hopping is usually carried out in one-burst (time slot) cycles.

GSM is a mobile communications system implemented with TDMA (Time Division Multiple Access) technology wherein each carrier (radio frequency) is time-divided into eight successive time slots of equal length. In each time slot some logical channel is placed, such as a BCH (Broadcast Channel), e.g. a BCCH (Broadcast Control Channel), a CCCH (Common Control Channel), a Dedicated Channel, e.g. SDCCH (Standalone Dedicated Control Channel) or a TCH (Traffic Channel), e.g. as is presented in FIG. 2.

FIG. 1 in the enclosed drawing shows a simplified block diagram of the GSM (Global System for Mobile communications). The MS (Mobile Station) is connected over a radio path to some BTS (Base Transceiver Station), in the case shown in FIG. 1 to base transceiver station BTS1. The BSS (Base Station System) consists of a BSC (Base Station Controller) and of base stations BTS controlled by the BSC. An MSC (Mobile Services Switching Centre) usually controls several base station systems BSS. The MSC is in connection with other mobile services switching centres and via GMSC (Gateway Mobile Services Switching Centre) the GSM network is connected to other networks, such as a public services telephone network PSTN, another mobile telephone network PLMN, an ISDN network or an intelligent network IN. The operation of the entire system is monitored by an OMC (Operation and Maintenance Centre). Subscriber data of the mobile station MS is stored permanently in the system's HLR (Home Location Register) and temporarily in that VLR (Visitor Location Register) in the area of which the mobile station MS is located at each time.

Base transceiver stations BTS transmit continuously on their broadcast channels such information intended for all mobile stations MS, which contains e.g. a BSIC (Base Station Identity Code), information on frequencies used at the base station and possibly on frequency hopping pattern applied, and adjacent cell information. The mobile station MS performs constant measurements of the signals of base transceiver stations BTS located closest to its location cell, e.g. in order to determine the base station providing the best signal and for a possible cell exchange. From the adjacent cell information transmitted by each base station on its broadcast channel the mobile station MS learns those frequencies of adjacent base stations which it should measure. From the base station identity code BSIC transmitted by each adjacent base station on its broadcast channel the mobile station MS will identify the measured base station. E.g. in a GSM mobile communications system, the mobile station MS can measure, besides the serving base station, also the signal level and/or quality of no more than 32 other base stations at the same time. The base transceiver stations BTS must transmit constantly at the same frequency the broadcast control channel BCCH containing the base station identity code BSIC and there must be transmission in all time slots of this carrier, for a mobile station MS not synchronised with the transmission of an adjacent base station to be able to interpret the base station identity code (BSIC) and to measure the signal level of the adjacent base station. When moving in the area of the mobile communications network, the mobile station MS is connected normally to listen to that base transceiver station BTS which has the most powerful signal. Thus the objective is to form a call terminating at the mobile station MS or a call originated by the mobile station MS primarily via this base transceiver station BTS on a free traffic channel assigned by the base station system BSS.

Continuously transmitted signals are a problem in networks utilising frequency hopping or discontinuous transmission for making the use of frequencies more efficient. When such a signal which is not suitable for discontinuous transmission is transmitted in a network at a frequency planned for shortened reuse distances, interference exceeding the interference level pre-planned will be caused to other cells of the network which use the same frequency and adjacent frequencies. Depending on the number of such interfering transmissions, the interference level may rise in the network to seriously interfere with other traffic, whereby the network capacity will be reduced. On the other hand, if interference which may be caused by continuously transmitted signals is taken into account in the frequency planning, it is not possible to arrange the reuse of frequencies very efficiently.

BRIEF DESCRIPTION OF THE INVENTION

It is a purpose of this invention to adapt a continuously transmitted signal to a radio network designed for discontinuous transmission so that any interference caused to the rest of the network will be minimised.

This new type of channel allocation for a radio connection is achieved with a method according to the invention which is characterised both by the features presented in the introduction and in that a fixed-frequency traffic channel defined as a continuous transmission channel is allocated in the method for a continuous transmission call.

The invention also concerns an arrangement for allocation of a traffic channel in a mobile communications system where some radio connections are implemented with a discontinuous transmission function. The system is adapted to identify continuous transmission calls. According to the invention, the arrangement is characterised in that it is adapted for allocation of a fixed-frequency traffic channel defined as a continuous transmission channel for a continuous transmission call.

The invention is based on the idea that for a continuously transmitted signal a radio channel is allocated from a carrier, the frequency planning of which is done taking into account the interference level caused by a continuously transmitted signal at a fixed frequency.

Since the carrier comprising a broadcast control channel BCCH must be constantly on for measurement of adjacent base stations, reuse of this frequency must be planned taking into account any interference caused by continuous transmission, although the frequency plan would otherwise utilise the reducing effect on the general interference level of discontinuous transmission and frequency hopping etc. In the present invention this feature required by measurements of adjacent base stations is utilised by assigning continuously transmitted signals on a carrier comprising the broadcast control channel BCCH. In the method according to the invention continuously transmitted connections are identified and a non-hopping traffic channel is allocated for these connections from a carrier designed for continuous transmission, such as from a BCCH carrier.

It is an advantage of such a channel allocation method that also a continuously transmitted signal may be transferred on the radio path without causing unforeseen interference to the rest of the network.

It is another advantage of the channel allocation method of this invention that use of the frequencies in the network can be made more efficient, when frequency planning can better utilise shorter frequency reuse distance which is achieved with functions lowering the network interference level, such as discontinuous transmission and frequency hopping.

It is another advantage of the arrangement according to this invention that it requires only minor changes to the known channel allocation arrangement in the mobile communications network and no changes at all to the structure of the mobile station.

LIST OF THE FIGURES

The invention will now be described more closely in connection with preferable embodiments and referring to the enclosed drawings, wherein.

DETAILED DESCRIPTION OF THE INVENTION

Figure 1:
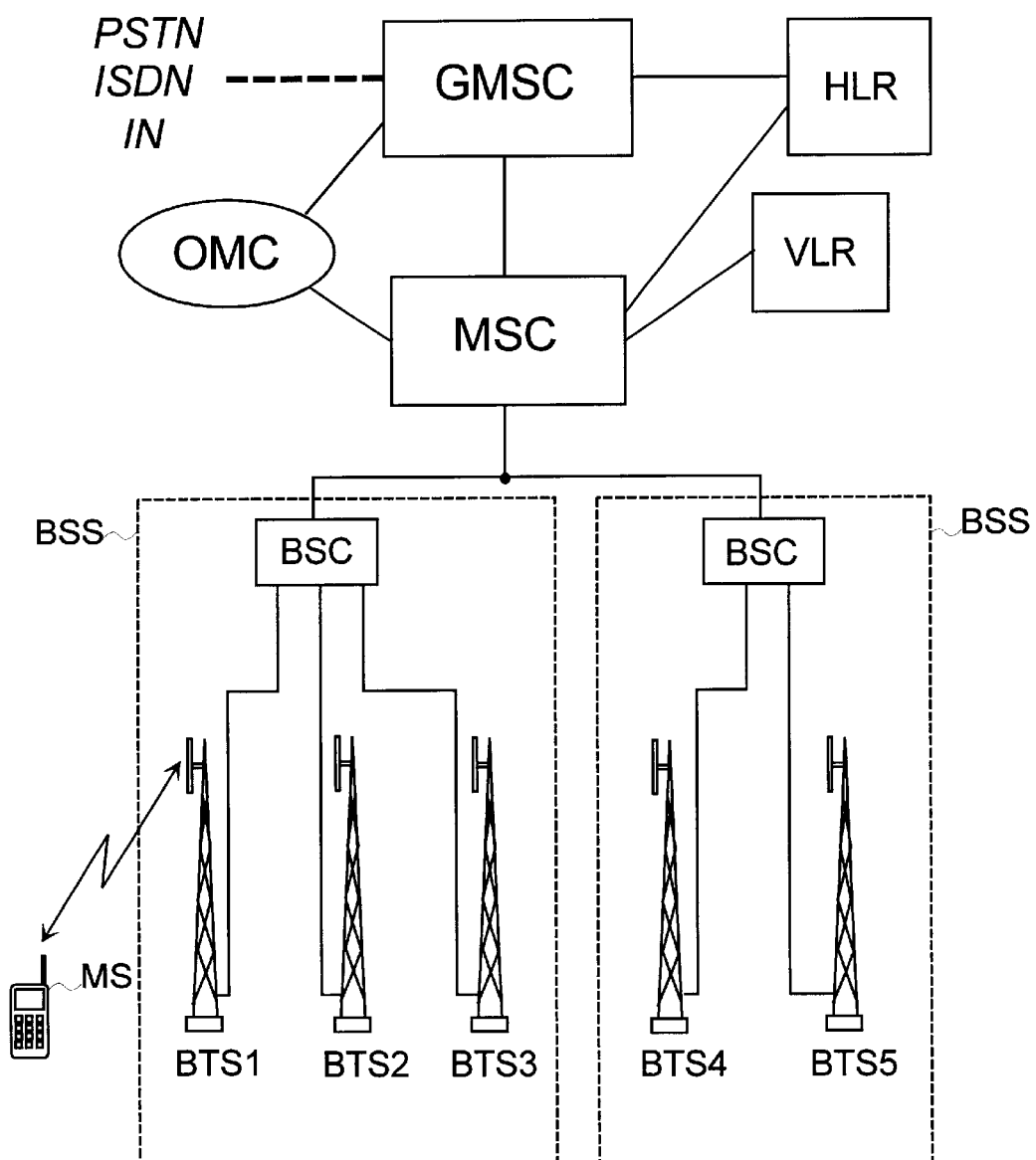
FIG. 1 shows such parts of the mobile communications network which are essential to the present invention.
Figure 2:
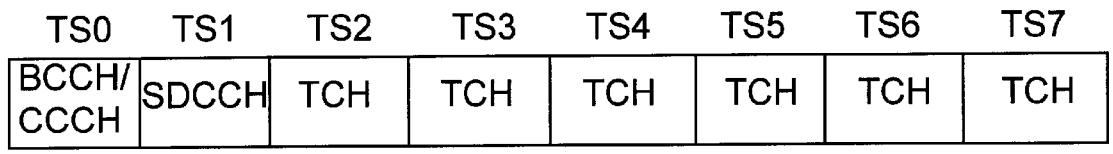
FIG. 2 shows an example of the location of logical channels in eight time slots in a frame of a TDMA system.

The present invention may be applied in connection with any mobile communications system. The invention is especially suitable for use in such mobile communications systems where radio-frequency hopping is used and where frequency plan is implemented by utilising functions lowering the network interference level. In the following, the invention is described more closely by way of example, principally relating to a Pan-European digital GSM mobile communications system. FIG. 1 shows the simplified structure of a GSM network described above. As regards a more specific description of the GSM system reference is made to GSM recommendations and to the book "The GSM System for Mobile Communications", M. Mouly & M. Pautet, Palaiseau, France, 1992, ISBN:2-9507190-0-7.

Figure 3:
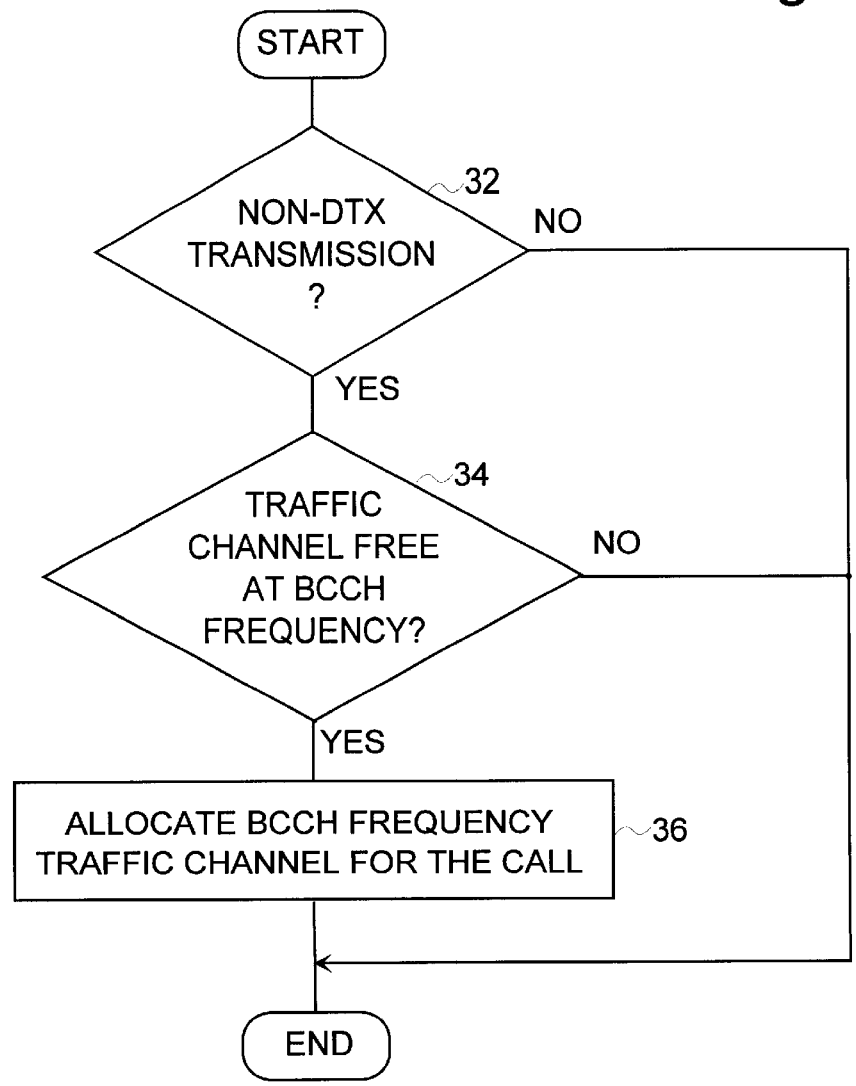
FIG. 3 is a flow chart of a primary embodiment of the channel allocation method according to the invention.

In the following the invention is described more closely in the light of a primary embodiment of the invention referring to FIG. 3. In connection with the connection set-up started by the mobile communications network or by the mobile station MS, it is determined, e.g. based on the mode of service of the connection, whether the connection to be set up is a continuous transmission non-DTX transmission, e.g. a transparent fax transmission (item 32 in FIG. 3). When the connection is a DTX transmission using discontinuous transmission functionality, e.g. normal speech or a non-transparent data transmission, the functionality of the channel allocation method according to the invention is passed by and some free traffic channel is allocated for the call according to the state of the art. If the connection is identified as a non-DTX transmission, a check is made at point 34 to find out whether there is any free traffic channel on the BCCH carrier. If a free traffic channel is found, this traffic channel is allocated to the non-DTX call (point 36), whereupon the radio connection is set up in accordance with the state of the art.

In a secondary embodiment of the invention, at least one traffic channel is reserved from the BCCH carrier wave of the base station for allocation to continuously transmitted signals. For example, if there is a total number of seven traffic channels on the BCCH carrier wave, e.g. two traffic channels are reserved preliminarily of these according to the secondary embodiment of the invention for allocation to continuously transmitted signals at a later stage. The operator may make his reservation of a suitable number of traffic channels depending on the traffic volumes of continuously transmitted signals. The secondary embodiment of the invention is otherwise similar to the primary embodiment described above, except that a check is made in point 34 of FIG. 3 to find out whether there are any free traffic channels reserved for continuously transmitted signals on the BCCH carrier. If such a preliminarily reserved traffic channel is free, it is allocated to the connection to be set up (point 36 in FIG. 3). With the channel reservation of the secondary embodiment of the invention the objective is to make sure that DTX transmissions will not take over all traffic channels of the BCCH carrier. In this embodiment, the primary objective is to allocate for a non-DTX signal some free traffic channel which has been preliminarily reserved for this purpose. However, if no preliminarily reserved traffic channel is available, but there are other free traffic channels on the BCCH carrier wave, such a free traffic channel of the BCCH carrier can be chosen for allocation to the non-DTX transmission.

A comparison of free traffic channels known as such in the field of radio engineering may also be added to the functionality according to the invention. Hereby base transceiver station BTS measures the interference level of free traffic channels in a manner known as such. The results of measurements are stored in the base station system BSS on a base station basis. In the connection set-up the base station system BSS, relying on the stored measurement results, chooses such a traffic channel from the free traffic channels, the measured background interference level of which is lower than the pre-set threshold level. In a third embodiment of the present invention, this comparison of interference levels of free traffic channels is combined with the allocation of traffic channels for non-DTX transmissions.

Figure 4:
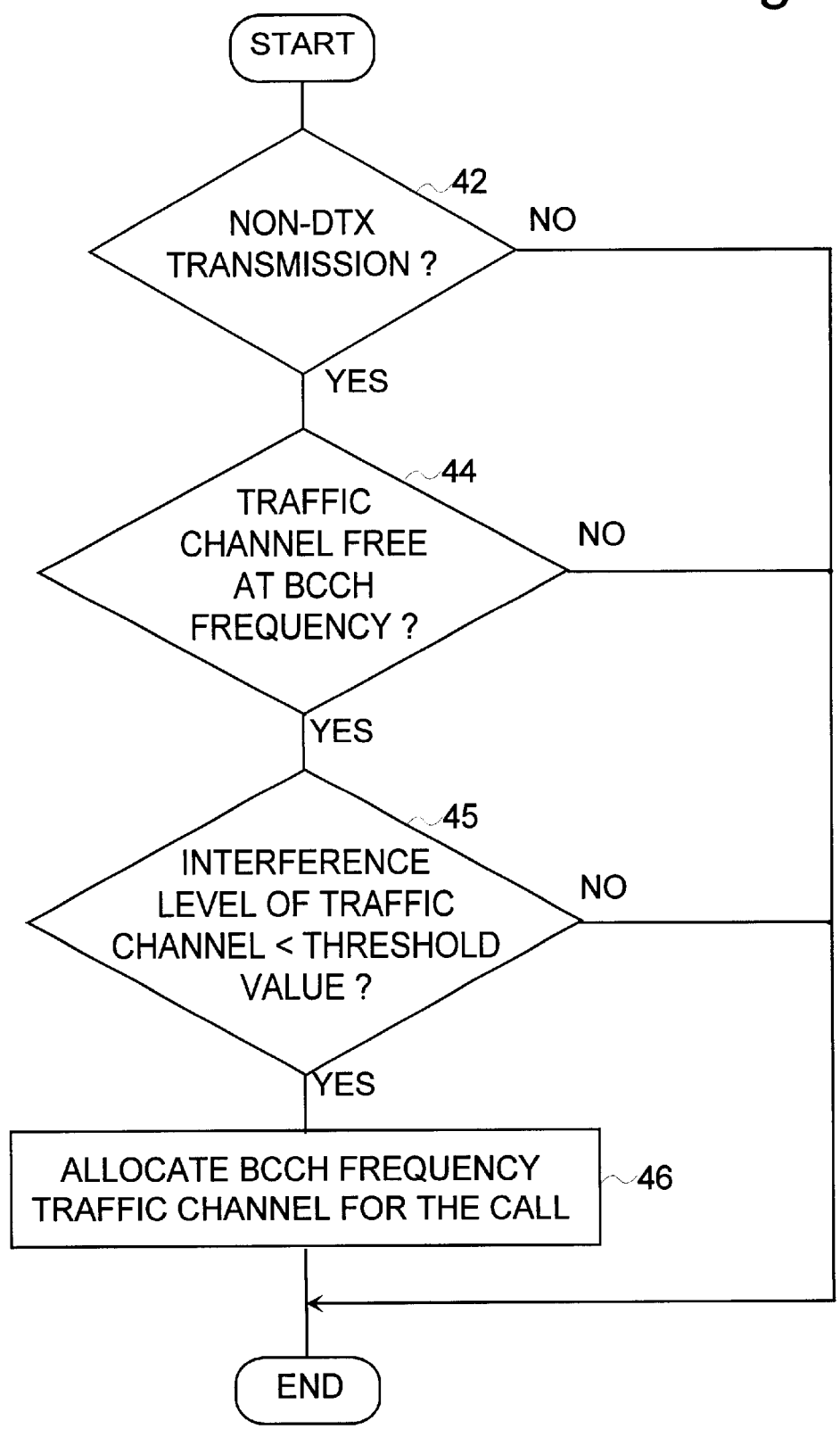
FIG. 4 is a flow chart of a third embodiment of the channel allocation method according to the invention.

The following is a description of a third embodiment of the invention referring to FIG. 4. A check is made at point 42 of FIG. 4 to find out whether the connection to be set up is a non-DTX transmission, correspondingly as was described above in connection with the primary embodiment of the invention. If the transmission is a non-DTX transmission, it is further checked at point 44 whether there are any free traffic channels on BCCH carrier, as stated above in connection with the description of FIG. 3. If at least one free traffic channel is found on the BCCH carrier, the interference levels measured from these traffic channels are compared with the threshold value of a pre-set acceptable interference level (point 45). If anyone of these traffic channels represents such an interference level value which is smaller than the threshold value, this traffic channel is allocated to the non-DTX connection to be set up (point 46). The radio connection is then set up in accordance with the state of the art.

The arrangement for performing the channel allocation according to the invention is located in connection with the base station system BSS, preferably in the base station controller BSC.

The drawings and their related explanation are intended only to illustrate the inventive idea. The channel allocation for radio communications according to the invention may vary in details within the scope of the claims. Although the invention was described above mainly in connection with a carrier comprising a broadcast control channel BCCH of a base station, the method of channel allocation according to the invention can be performed also on a traffic channel of some other kind of carrier determined for continuous transmission at a fixed frequency. The invention is also suitable for use in mobile communications networks using only discontinuous transmission functionality in some radio connections but using no frequency hopping at all.

What is claimed is:

1. A method of channel allocation in a mobile communications system, in the frequency planning of which at least one frequency is set at a reuse distance which is shorter than the reuse distance of a continuous transmission frequency, in which method continuous transmission calls are identified, the method comprising allocating a traffic channel for a continuous transmission call at a fixed frequency defined as a continuous transmission frequency, when the traffic channel is free.

2. The method according to claim 1, wherein the traffic channel is allocated for the continuous transmission call from a carrier comprising a broadcast control channel of a base station.

3. The method according to claim 2, wherein the allocation of the traffic channel for the continuous transmission call further comprises:

preliminarily reserving at least one of the traffic channels of the carrier comprising the broadcast control channel for the continuous transmission calls; and preliminarily reserving the free traffic channel for the continuous transmission call.

4. The method according to claim 1, wherein allocation of the traffic channel further comprises:

comparing an interference level of free traffic channels with a pre-set threshold value; and choosing the traffic channel with an interference level lower than the pre-set threshold value as the traffic channel for allocation to the call.

5. An arrangement for allocation of a traffic channel in a mobile communications system, in the frequency planning of which at least one frequency is set at a reuse distance shorter than the reuse distance of a continuous transmission frequency, which arrangement is adapted to identify continuous transmission calls, the arrangement comprising adapting the arrangement to allocate a traffic channel for a continuous transmission call at a fixed frequency defined as a continuous transmission frequency, when the traffic channel is free.

6. The arrangement according to claim 5, wherein the fixed-frequency traffic channel defined as a continuous transmission traffic channel is located on a carrier comprising a broadcast control channel of a base station.

7. The arrangement according to claim 6, wherein the allocation of the traffic channel for the continuous transmission call further comprises:

adapting the arrangement for preliminary reservation of at least one traffic channel for continuous transmission calls from a carrier comprising a broadcast control channel; and allocating the free preliminarily reserved traffic channel for a continuous transmission call.

8. The arrangement according to claim 5, wherein the arrangement is located in connection with a base station system.

* * * * *